(12) United States Patent
Suzuki

(10) Patent No.: US 8,816,597 B2
(45) Date of Patent: Aug. 26, 2014

(54) LED DRIVING CIRCUIT

(75) Inventor: Shinichi Suzuki, Nagano (JP)

(73) Assignee: Minebea Co., Ltd, Nagano (JP)

( * ) Notice: Subject to any disclaimer, the term of this patent is extended or adjusted under 35 U.S.C. 154(b) by 438 days.

(21) Appl. No.: 12/950,106

(22) Filed: Nov. 19, 2010

(65) Prior Publication Data

US 2011/0140622 A1 Jun. 16, 2011

(30) Foreign Application Priority Data

Dec. 14, 2009 (JP) .................................. 2009-282444

(51) Int. Cl.
*H05B 37/02* (2006.01)
*H05B 33/08* (2006.01)
(52) U.S. Cl.
CPC .................................. *H05B 33/0809* (2013.01)
USPC .......................................................... 315/291
(58) Field of Classification Search
None
See application file for complete search history.

(56) References Cited

U.S. PATENT DOCUMENTS

| 6,359,794 | B1 * | 3/2002 | Real ................................. 363/17 |
| 7,872,427 | B2 | 1/2011 | Scianna | |
| 2007/0182347 | A1 * | 8/2007 | Shteynberg et al. .......... 315/312 |
| 2007/0262727 | A1 * | 11/2007 | Suzuki et al. .................. 315/219 |
| 2008/0048573 | A1 * | 2/2008 | Ferentz et al. ................ 315/193 |
| 2008/0224629 | A1 * | 9/2008 | Melanson ..................... 315/247 |
| 2008/0278092 | A1 * | 11/2008 | Lys et al. ....................... 315/247 |

FOREIGN PATENT DOCUMENTS

| JP | 2006-139755 A | 6/2006 |
| JP | 2007-538378 A | 12/2007 |
| JP | 2009-026544 A | 2/2009 |

* cited by examiner

*Primary Examiner* — Jason M Crawford
*Assistant Examiner* — Christine Johnson
(74) *Attorney, Agent, or Firm* — Carrier Blackman & Associates, P.C.; Joseph P. Carrier; Anne G. Sabourin

(57) ABSTRACT

An LED driving circuit includes a dimming circuit that controls a conducting angle of an alternating current supplied from a power supply to phase-control a current to be supplied to an LED, a rectifier circuit that rectifies an alternating-current voltage output from the dimming circuit, a smoothing circuit that smoothes a direct current voltage output from the rectifier circuit, a switching device that is connected with the LED in series; a constant current control circuit that outputs a high frequency pulse signal to the switching device to control the switching device, and a bleeder circuit that is provided between an output terminal of the rectifier circuit and a ground and that has a bleeder resistance and a bleeder switch connected in series. The high frequency pulse signal is input to the bleeder switch so that a bleeder current having a high frequency pulse form flows in the bleeder resistance.

2 Claims, 3 Drawing Sheets

LED DRIVING CIRCUIT

BACKGROUND OF THE INVENTION

1. Field of the Invention

The present invention relates to a light emitting diode (LED) driving circuit, and more specifically, to an LED driving circuit that uses a phase-controlled dimming circuit for constant current drive of an LED.

2. Description of the Related Art

Conventionally, in an illumination apparatus having an incandescent lamp as a light source for illumination, a phase-controlled dimming circuit has been widely used which uses a TRIAC (bidirectional thyrister) to perform a dimming operation. The dimming circuit includes a controller, and the controller controls a conducting angle of the TRIAC to change a duty ratio of a commercial alternating-current power supply voltage to be supplied to the dimming circuit. Accordingly, power to be supplied to the light source is changed, so that the dimming operation is performed.

Recently, also in an illumination apparatus having an LED as a light source for illumination, a dimming device including a phase-controlled dimming circuit capable of performing a dimming operation has been suggested (for example, refer to JP-A-2009-26544).

JP-A-2009-26544 describes a dimming device for an LED. The device includes a dimming circuit that controls a conducting angle of alternating current supplied from a commercial alternating-current power supply so as to phase-control an alternating current to be supplied to an LED, a rectifier circuit that rectifies a voltage waveform of an alternating current output from the dimming circuit to output a direct current voltage, a smoothing circuit that smoothes the direct current voltage output from the rectifier circuit to output the smoothed voltage to the LED, an A/D converter circuit that converts a voltage waveform of the alternating current output from the dimming circuit into a digital voltage signal, a PWM signal generation circuit that obtains a conducting angel set in the dimming circuit from the digital voltage signal and generates a PWM signal for controlling a current flowing time of the current to be supplied to the LED by first pulse width modulation (PWM) to achieve a duty cycle for dimming operation corresponding to the conducting angle, a first switching circuit that switches ON/OFF of the current to be supplied to the LED, a PWM control circuit that controls the switching operation of the first switching circuit by second PWM so as to allow constant current to flow in the LED, and a second switching circuit that causes the first switching circuit to perform an ON switching operation by the PWM control circuit during a period when a PWM waveform of the PWM signal output from the PWM signal generation circuit is high (H).

However, the dimming device that performs the LED dimming with the conventional phase-controlled dimming circuit, which is described in JP-A-2009-26544, has the following problems.

Conventionally, the dimming circuit using the TRIAC which performs the dimming operation for an incandescent lamp used for illumination in a general house has been widely spread, and the incandescent lamp tends to be replaced with an LED illumination device. Therefore, resulting from mismatch between the dimming circuit having the TRIAC and the LED illumination device, flicker or flash may occur. In other words, the dimming circuit is originally designed for the incandescent lamp as a load. Since the efficiency of the LED illumination is high, the current flowing in the TRIAC becomes smaller. Therefore, the dimming circuit may malfunction due to foreign noise or noise resulting from interference between the dimming circuits. In order to solve the problems, a method is conceivable where a bleeder current (holding current) depending on holding current characteristics of the TRIAC is caused to flow so as to keep a conducting state of the dimming circuit. However, as the bleeder current flows, power loss in a bleeder circuit of the LED driving circuit increases and the temperature thereof increases largely.

SUMMARY OF THE INVENTION

The present invention has been made in light of the problems described above, and it is an object of the present invention to provide an LED driving circuit having a simple circuit configuration and capable of reducing or preventing a malfunction of the dimming circuit, which is caused due to foreign noise or noise resulting from interference between the dimming circuits, without high power loss.

According to a first aspect of the present invention, there is provided an LED driving circuit for driving an LED, including a dimming circuit that controls a conducting angle of an alternating current supplied from a commercial alternating-current power supply so as to phase-control a current to be supplied to the LED, a rectifier circuit that rectifies an alternating-current voltage output from the dimming circuit, a smoothing circuit that smoothes a direct current voltage output from the rectifier circuit, a switching device that is connected with the LED in series, a constant current control circuit that outputs a high frequency pulse signal to the switching device to control an ON/OFF operation of the switching device so that a current flowing in the LED becomes constant, and a bleeder circuit that is provided between an output terminal of the rectifier circuit and a ground and that has a bleeder resistance and a bleeder switch which are connected with each other in series. The high frequency pulse signal is input to the bleeder switch so that a bleeder current having a high frequency pulse form flows in the bleeder resistance.

According to a second aspect of the present invention, there is provided an LED driving circuit for driving an LED, including a dimming circuit that controls a conducting angle of an alternating current supplied from a commercial alternating-current power supply so as to phase-control a current to be supplied to the LED, a rectifier circuit that rectifies an alternating-current voltage output from the dimming circuit, a smoothing circuit that smoothes a direct current voltage output from the rectifier circuit, a switching device that is connected with the LED in series, a constant current control circuit that outputs a high frequency pulse signal to the switching device to control an ON/OFF operation of the switching device so that current flowing in the LED becomes constant, and a bleeder circuit that is provided between an output terminal of the rectifier circuit and a ground and that has a bleeder resistance and a bleeder switch which are connected with each other in series. A high frequency pulse signal output from an oscillation circuit is input to the bleeder switch so that a bleeder current having a high frequency pulse form flows in the bleeder resistance.

According to the above configuration, it is possible to provide an LED driving circuit having a simple circuit configuration and capable of reducing or preventing a malfunction of the dimming circuit, which is caused due to foreign noise or noise resulting from interference between the dimming circuits, without high power loss.

DETAILED DESCRIPTION OF ILLUSTRATIVE EMBODIMENTS

Hereinafter, illustrative embodiments of the present invention will be described with reference to the drawings.

First Illustrative Embodiment

Figure 1:
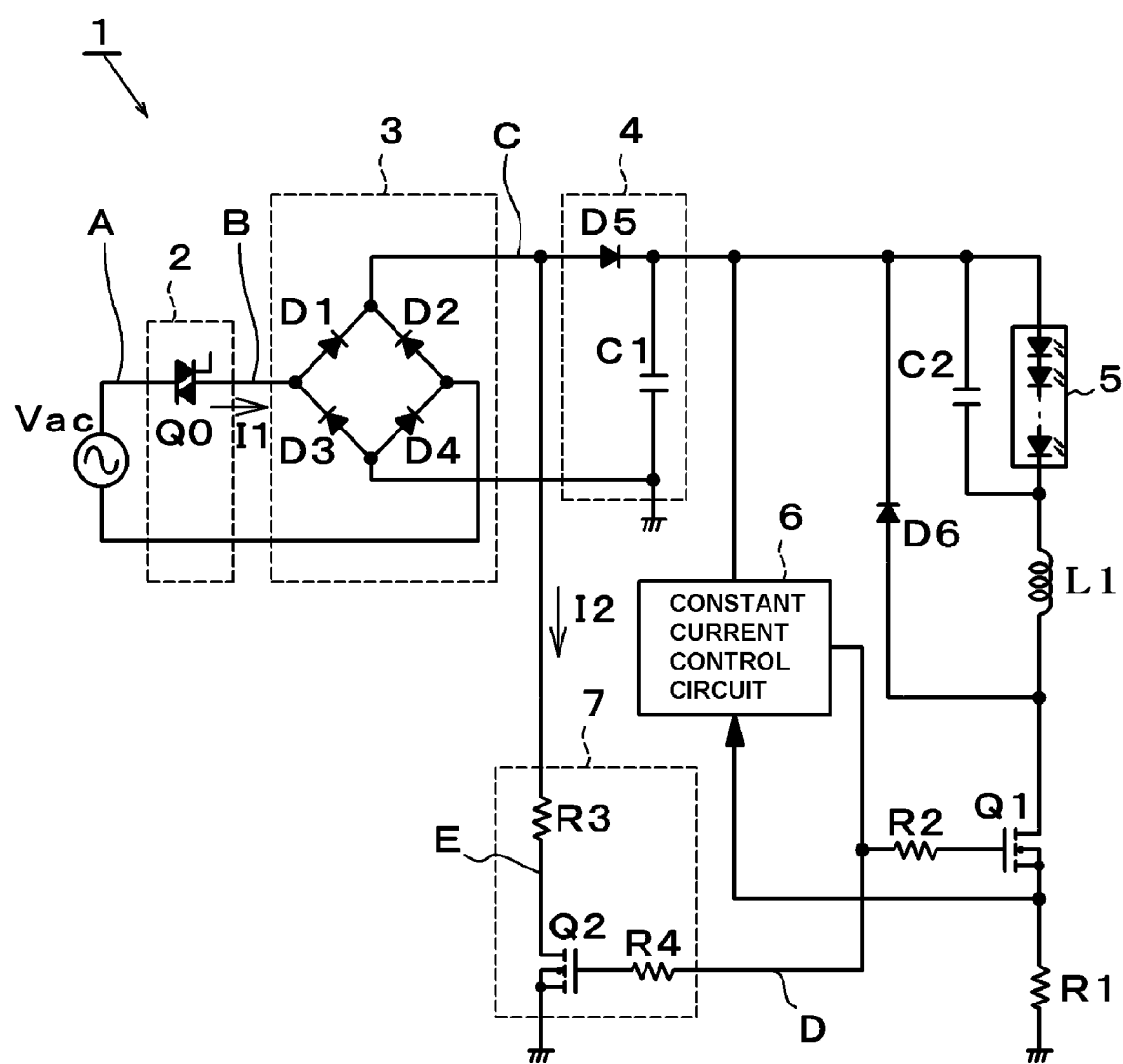
FIG. 1 is a circuit diagram of an LED driving circuit according to a first illustrative embodiment of the present invention.
Figure 2:
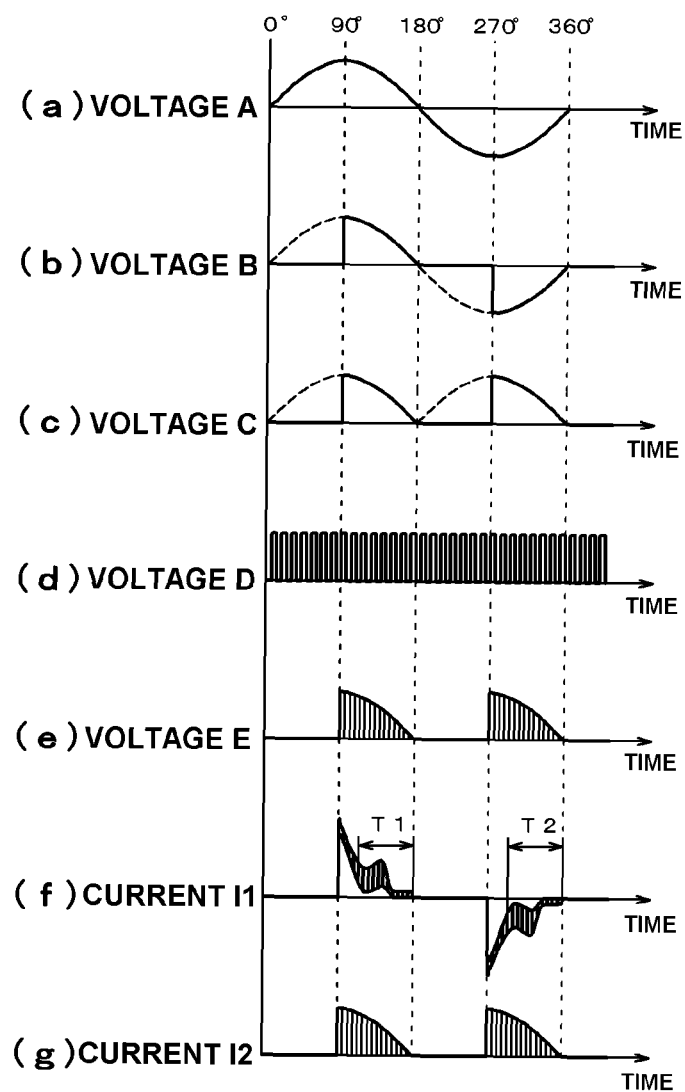
FIG. 2 schematically shows a voltage waveform or a current waveform of each point of the circuit shown in FIG. 1.

FIG. 1 is a circuit diagram of an LED driving circuit according to a first illustrative embodiment of the present invention, and (a) to (g) of FIG. 2 schematically show a voltage waveforms or a current waveforms of each point of the circuit shown in FIG. 1.

As shown in FIG. 1, an LED driving circuit 1 includes a dimming circuit 2 that controls a conducting angle of an alternating current supplied from a commercial alternating-current power supply Vac so as to phase-control a current to be supplied to a light emitting diode (LED) module 5, a rectifier circuit 3 that rectifies an alternating-current voltage output from the dimming circuit 2 and a smoothing circuit 4 that smoothes a direct current voltage output from the rectifier circuit 3, and drives the LED module 5 that is a light source for illumination. The LED driving circuit 1 further includes a constant current control circuit 6 that allows a current to constantly flow in the LED module 5. In this illustrative embodiment, the LED module 5 is configured by connecting a plurality of individual LED devices in series. However, the configuration of the LED module 5 of the LED driving circuit 1 of the present invention is not limited thereto. For example, the LED module includes an arbitrary light source having one or more LED devices. It the meantime, an output condenser C2 connected in parallel with the LED module 5 is provided to reduce current ripple.

The dimming circuit 2 has a TRIAC Q0, a controller (not shown) that supplies a trigger to the TRIAC Q0 for switching the TRIAC Q0 into an ON state at a predetermined conducting angle of the commercial AC power supply Vac, a variable resistance that variously sets the predetermined conducting angle to change a dimming degree of the LED module 5, and the like.

The rectifier circuit 3 is a full-wave rectifier circuit having a known diode bridge having four diodes D1 to D4. The smoothing circuit 4 has a diode D5 and a condenser C1.

There are provided an inductor L1, a switching device Q1 including a MOSFET and a current detection resistance R1 connected in series between the LED module 5 and a ground. When the switching device Q1 is at an ON operation, the smoothing current smoothened by the smoothing circuit 4 passes the LED module 5, the inductor L1 and the switching device Q1 and flows to the ground via the current detection resistance R1. The current flowing in the LED module 5 is detected by the current detection resistance R1 and is converted into a voltage signal, which is then fed back to the constant current control circuit 6. When a value of the voltage signal fed back exceeds a first reference voltage, the constant current control circuit 6 outputs an OFF operation signal to a gate terminal of the switching device Q1 through a resistance element R2. During a period when the switching device Q1 is OFF, the current charged in the inductor L1 flows to the LED module 5 via a diode D6 that is connected in parallel with a series circuit of the LED module 5 and the inductor L1. After that, since the OFF time of the switching device Q1 is fixed, the constant current control circuit 6 outputs an ON operation signal to the gate terminal of the switching device Q1 through the resistance element R2 after a predetermined OFF time period. The above process is repeated, so that the constant current flows in the LED module 5 under control of the constant current control circuit 6. In the meantime, as a high frequency pulse signal output from the constant current control circuit 6, frequency of 40 kHz to 60 kHz is used.

The LED driving circuit 1 of this illustrative embodiment further includes a bleeder circuit 7 that is provided between an output terminal of the rectifier circuit 3 and the ground, and a bleeder current flows therethrough as the high frequency pulse signal output from the constant current control circuit 6 is input. The bleeder circuit 7 has a bleeder resistance R3 and a bleeder switch Q2 which are connected with each other in series. The bleeder switch Q2 includes a MOSFET. The bleeder circuit 7 causes the bleeder current (holding current) necessary for the dimming circuit 2 to flow and cancels a current of minus direction, which is overlapped with the dimming current of the dimming circuit 2 due to the foreign noise or interference between the dimming circuits 2, with the bleeder current having a high frequency pulse form.

An operation of the bleeder circuit 7 will be described in more detail with reference to FIG. 2.

As shown in FIG. 2, a voltage waveform (a) of the alternating-current voltage A supplied from the commercial AC power supply Vac is converted into a voltage waveform (b) of a voltage B having a conducting angle (90° to 180° and 270° to 360° in an example of FIG. 2) set in the dimming circuit 2, and is converted into a voltage waveform (c) of a ripple voltage C having the same conducting angle by the rectifier circuit 3. In the bleeder circuit 7, a high frequency pulse signal showing a voltage waveform (d) of a voltage D output from the constant current control circuit 6 is input to the gate terminal of the bleeder switch Q2 through the resistance element R4. The bleeder switch Q2 is switched by the high frequency pulse signal, so that a voltage waveform (e) of a voltage E of the bleeder resistance R3 has a high frequency pulse form and a current waveform (g) of a bleeder current I2 flowing in the bleeder resistance R3 also has a high frequency pulse form.

Since the bleeder current I2 of the high frequency pulse form flows by the bleeder circuit 7, a current waveform (f) of a dimming current I1 output from the dimming circuit 2 is overlapped with the bleeder current having the high frequency pulse form.

If the LED driving circuit is not provided with the bleeder circuit and the bleeder current does not flow when the foreign noise or noise due to the interference between the dimming circuits 2 (typically, a frequency of the noise is about 20 kHz) is applied to the dimming circuit 2, the current of minus direction due to the noise is overlapped with the dimming current I1 of the dimming circuit. Therefore, the dimming current I1 is lowered, particularly during the periods of T1 and T2, so that a malfunction can be caused in the dimming circuit 2. However, as in this illustrative embodiment, if the bleeder current I2 having the high frequency pulse form flows in the bleeder circuit 7, the current of minus direction overlapped with the dimming current I1 of the dimming circuit 2 due to the noise is cancelled by the bleeder current I2 that has the high frequency pulse form with a frequency higher than the noise and that is overlapped with the dimming current I1 in a plus direction, particularly during the periods of T1 and T2. Therefore, the lowering of the dimming current I1 is suppressed, so that a malfunction of the dimming circuit 2 can be reduced or prevented.

As described above, according to the LED driving circuit 1 of this illustrative embodiment, there is provided the bleeder circuit 7 that is provided between the output terminal of the rectifier circuit 3 and the ground, and that has the bleeder resistance R3 and the bleeder switch Q2 which are connected with each other in series, and the high frequency pulse signal output from the constant current control circuit 5 is input to the bleeder switch Q2, so that the bleeder current I2 having the high frequency pulse form is caused to flow in the bleeder resistance R3. When the current of minus direction is overlapped with the dimming current I1 of the dimming circuit 2 due to the foreign noise or noise resulting from the interference between the dimming circuits 2, the current of minus direction is cancelled by the bleeder current I2 having the high frequency pulse form overlapped with the dimming current I1 in the plus direction. Therefore, it is possible to reduce or prevent a malfunction of the dimming circuit 2 due to the foreign noise or noise resulting from the interference between the dimming circuits 2.

Additionally, in the LED driving circuit 1, as the high frequency pulse signal input to the bleeder switch Q2, the high frequency pulse signal, which is output from the constant current control circuit 6 to the switching device Q1 used so as to make the current flowing in the LED module 5 constant, is also used. Therefore, it is not necessary to separately provide an oscillation circuit for generating a high frequency pulse signal, so that the LED driving circuit can be simplified.

Furthermore, in the LED driving circuit 1, the bleeder current I2 flowing in the bleeder resistance R3 has the high frequency pulse form and the ON duty is small. Therefore, it is possible to reduce the overall power loss of the LED driving circuit 1 and the high temperature rise does not occur.

Second Illustrative Embodiment

Next, an LED driving circuit 1a according to a second illustrative embodiment of the present invention will be described. In the followings, the constitutional elements corresponding to those of the LED driving circuit 1 of the first illustrative embodiment are indicated with the same reference numerals, the descriptions common to the LED driving circuit 1 of the first illustrative embodiment are omitted and the differences will be mainly described.

Figure 3:
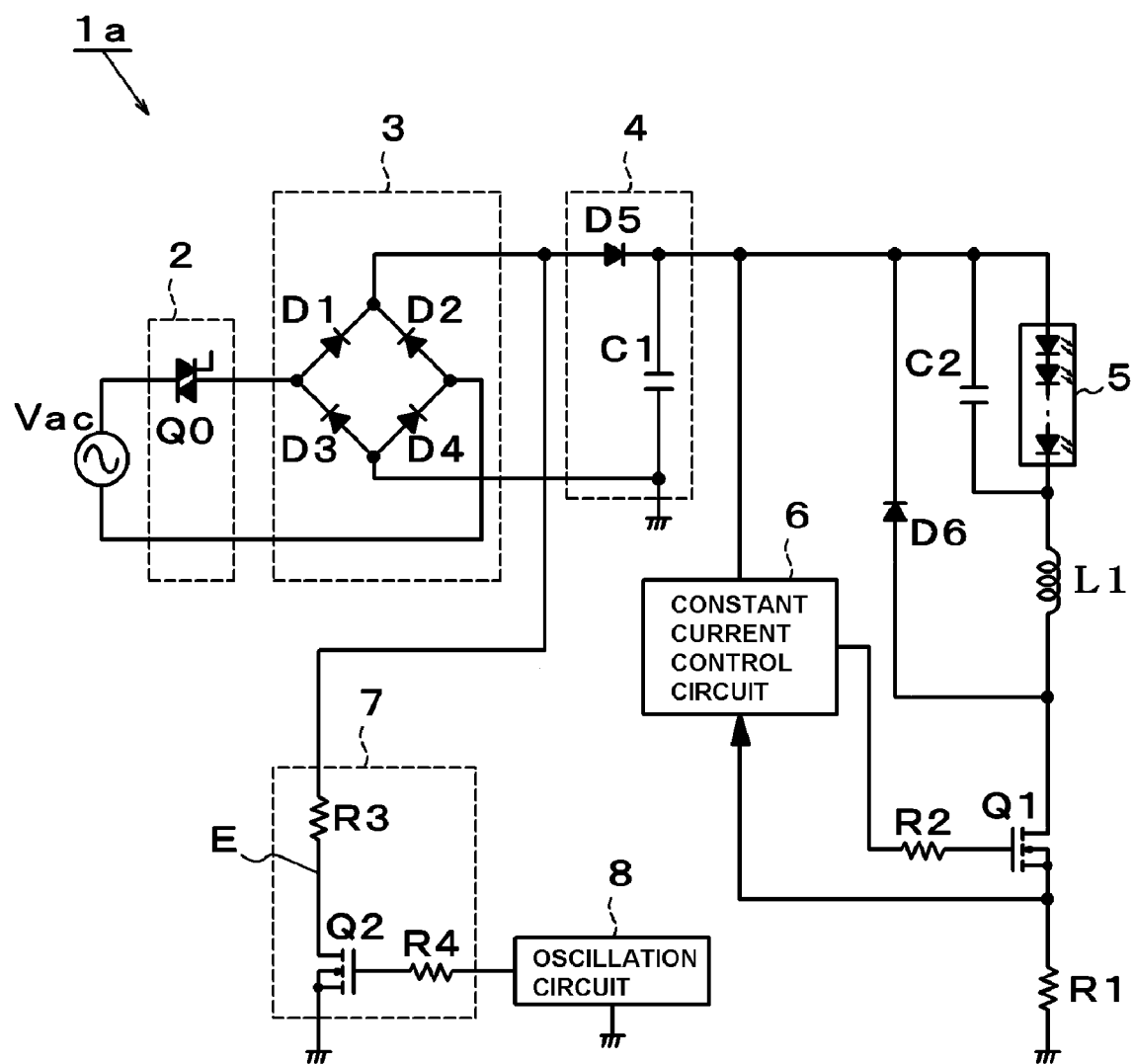
FIG. 3 is a circuit diagram of an LED driving circuit according to a second illustrative embodiment of the present invention.

FIG. 3 is a circuit diagram showing an LED driving circuit 1a according to the second illustrative embodiment of the present invention.

As shown in FIG. 3, the LED driving circuit 1a of this illustrative embodiment has an oscillation circuit 8. That is, the high frequency pulse signal input to the bleeder circuit 7 is output not from the constant current control circuit 6 but from the oscillation circuit 8, contrary to the first illustrative embodiment. The other circuit configurations are the same as the first illustrative embodiment.

In the LED driving circuit 1a of this illustrative embodiment, the high frequency pulse signal output from the oscillation circuit 8 is input to the bleeder switch Q2 of the bleeder circuit 7. Since the bleeder switch Q2 is switched with a high frequency, the current waveform of the bleeder current flowing in the bleeder resistance R3 has a high frequency pulse form. Therefore, the dimming current output from the dimming circuit 2 is overlapped with the high frequency pulse signal.

According to the LED driving circuit 1a of this illustrative embodiment, similarly to the LED driving circuit 1 of the first illustrative embodiment, the current of minus direction, which is overlapped with the dimming current of the dimming circuit 2 due to the foreign noise or noise resulting from the interference between the dimming circuits 2, is cancelled by the bleeder current that has the high frequency pulse form with a frequency higher than the noise and that is overlapped with the dimming current in a plus direction. Thus, the lowering of the dimming current is suppressed, so that a malfunction of the dimming circuit 2 can be reduced or prevented.

In addition, according to the LED driving circuit 1a of this illustrative embodiment, the high frequency pulse signal generated in the oscillation circuit 8 is used as the high frequency pulse signal input to the bleeder circuit 7. That is, the high frequency pulse signal input to the bleeder circuit 7 is not the high frequency pulse signal output to the switching device Q1 from the constant current control circuit 6 used in the LED driving circuit 1 of the first illustrative embodiment. Accordingly, it is possible to freely set a frequency or ON duty, as required.

Further, in this illustrative embodiment, the oscillation circuit 8 is provided in the LED driving circuit 1a. However, the present invention is not limited thereto. That is, the oscillation circuit may be not provided in the LED driving circuit. In this case, the oscillation circuit may be provided outside the LED driving circuit and the LED driving circuit may receive the high frequency pulse signal output from the oscillation circuit.

While the present invention has been shown and described with reference to certain exemplary embodiments thereof, it will be understood by those skilled in the art that various changes in form and details may be made therein without departing from the spirit and scope of the invention as defined by the appended claims.

For example, according to the LED driving circuits 1, 1a of the first and second illustrative embodiments, the MOSFET is used for the switching device Q1 and the bleeder switch Q2. However, the present invention is not limited thereto. For example, a bipolar-type transistor may be used.

In addition, the full-wave rectifier circuit including the diode bridge is used for the rectifier circuit 3 in the first and second illustrative embodiments. However, the present invention is not limited thereto, and the other rectifier circuits may be used.

Furthermore, the conducting angle set in the dimming circuit 2 is not limited to the waveform shown in FIG. 2. For example, the present invention can be applied to a dimming circuit in which an arbitrary conducting angle is set.

What is claimed is:

1. An LED driving circuit for driving an LED, the circuit comprising:
    a dimming circuit that controls a conducting angle of an alternating current supplied from a commercial alternating-current power supply so as to phase-control a current to be supplied to the LED;
    a rectifier circuit that rectifies an alternating-current voltage output from the dimming circuit;
    a smoothing circuit that smoothes a direct current voltage output from the rectifier circuit;
    a switching device that is connected with the LED in series;
    a constant current control circuit that outputs a pulse signal to the switching device to control an ON/OFF operation of the switching device so that a current flowing in the LED becomes constant; and a bleeder circuit that is provided between an output terminal of the rectifier circuit and a ground and that has a bleeder resistance and a bleeder switch which are connected with each other in series, wherein the pulse signal which is input to the switching device, is also input to the bleeder switch and a bleeder current having a pulse form flows in the bleeder resistance, and the bleeder current pulse is overlapped to a dimming current output from the dimming circuit.

2. An LED driving circuit for driving an LED, the circuit comprising:

a dimming circuit that controls a conducting angle of an alternating current supplied from a commercial alternating-current power supply so as to phase-control a current to be supplied to the LED;

a rectifier circuit that rectifies an alternating-current voltage output from the dimming circuit;

a smoothing circuit that smoothes a direct current voltage output from the rectifier circuit;

a switching device that is connected with the LED in series;

a constant current control circuit that outputs a pulse signal to the switching device to control an ON/OFF operation of the switching device so that current flowing in the LED becomes constant; and a bleeder circuit that is provided between an output terminal of the rectifier circuit and a ground and that has a bleeder resistance and a bleeder switch which are connected with each other in series, wherein a pulse signal, which is output from an oscillation circuit and is independent from the pulse signal input to the switching device, is input to the bleeder switch and a bleeder current having a pulse form flows in the bleeder resistance, and the bleeder current having the pulse is overlapped to a dimming current output from the dimming circuit.

* * * * *